United States Patent
Agarwal et al.

(10) Patent No.: US 12,505,551 B1
(45) Date of Patent: Dec. 23, 2025

(54) APPARATUS AND METHOD FOR AUTOMATICALLY EXTRACTING CANONICAL VIEWS FROM ULTRASOUND IMAGING DATA

(71) Applicant: Anumana, Inc., Cambridge, MA (US)

(72) Inventors: Animesh Agarwal, San Mateo, CA (US); Abhijith Chunduru, Bengaluru (IN); Suthirth Vaidya Subramany, Bengaluru (IN); Rakesh Barve, Bengaluru (IN)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 19/253,766

(22) Filed: Jun. 28, 2025

(51) Int. Cl.
*G06T 7/00* (2017.01)
*G06V 10/44* (2022.01)
(Continued)

(52) U.S. Cl.
CPC .......... *G06T 7/0012* (2013.01); *G06V 10/44* (2022.01); *G06V 10/761* (2022.01);
(Continued)

(58) Field of Classification Search
CPC ... A61B 8/463; A61B 8/461; A61B 2090/378; G06T 2207/10132; G06T 7/0012;
(Continued)

(56) References Cited

U.S. PATENT DOCUMENTS 10,702,248 B2 * 7/2020 Vignon ............... A61B 8/5292
2019/0012557 A1 * 1/2019 Wnuk ............... G06F 16/5838
(Continued)

FOREIGN PATENT DOCUMENTS

CN 114519705 A 5/2022
DE 102022112479 A1 11/2022

OTHER PUBLICATIONS

Peifei Zhu, Zisheng Li, "Guideline-based learning for standard plane extraction in 3-D echocardiography," J. Med. Imag. 5(4) 044503 (Nov. 20, 2018) https://doi.org/10.1117/1.JMI.5.4.044503 (Year: 2018).*

*Primary Examiner* — Courtney Joan Nelson
(74) *Attorney, Agent, or Firm* — Caldwell Intellectual Property Law

(57) ABSTRACT

An apparatus and method for automatically extracting canonical views from ultrasound imaging data. The apparatus includes at least a processor and a memory communicatively connected to the at least a processor. The memory instructs the processor to receive the ultrasound data from the at least a transducer, classify, using an extractor, a plurality of canonical views, wherein classifying the plurality of canonical views comprises identifying a plurality of initial canonical views, generating a plurality of comparisons of the plurality of initial canonical views to a plurality of reference canonical views, and classifying the plurality of initial canonical views as matching canonical views and non-matching canonical views as a function of the plurality of comparisons, extract a matched canonical view, from the initial canonical views that are classified as matching canonical views as a function of a similarity metric, and display the matched canonical view.

20 Claims, 7 Drawing Sheets

(51) Int. Cl.
*G06V 10/74* (2022.01)
*G06V 10/764* (2022.01)
*G16H 30/20* (2018.01)

(52) U.S. Cl.
CPC ............ *G06V 10/764* (2022.01); *G16H 30/20* (2018.01); *G06T 2207/10132* (2013.01); *G06T 2207/20081* (2013.01); *G06T 2207/30021* (2013.01)

(58) Field of Classification Search
CPC ................. G06T 19/00; G06T 2200/24; G06T 2207/20081; G06T 2207/30021; G16H 30/40; G16H 50/20; G16H 30/20; G06V 10/761; G06V 10/44; G06V 10/764
See application file for complete search history.

(56) References Cited

U.S. PATENT DOCUMENTS

2019/0354856 A1* 11/2019 Kezurer ................. A61B 8/585
2021/0345992 A1  11/2021 Cook et al.
2022/0071595 A1   3/2022 Mienkina et al.

* cited by examiner

APPARATUS AND METHOD FOR AUTOMATICALLY EXTRACTING CANONICAL VIEWS FROM ULTRASOUND IMAGING DATA

FIELD OF THE INVENTION

The present invention generally relates to the field of medical imaging. In particular, the present invention is directed to an apparatus and a method for automatically extracting canonical views from ultrasound imaging data.

BACKGROUND

Recent advancements in artificial intelligence and robotics aim to address the challenges of manual ultrasound imaging by automating the acquisition of standardized views, reducing the reliance on highly trained technicians. However, integrating AI-driven automation into clinical workflows presents challenges related to accuracy, regulatory approval, and real-world adoption in diverse healthcare settings.

SUMMARY OF THE DISCLOSURE

In an aspect, an apparatus for automatically extracting canonical views from ultrasound imaging data includes at least a processor and a memory communicatively connected to the at least a processor. The memory contains instructions configuring the processor to receive the ultrasound data from the at least a transducer, classify, using an extractor, a plurality of canonical views, wherein classifying the plurality of canonical views comprises identifying, using the extractor, a plurality of initial canonical views, generating, using the extractor, a plurality of comparisons of the plurality of initial canonical views to a plurality of reference canonical views, and classifying, using the extractor, the plurality of initial canonical views as matching canonical views and non-matching canonical views as a function of the plurality of comparisons, extract, using the extractor, a matched canonical view, from the initial canonical views that are classified as matching canonical views as a function of a similarity metric, and display, using a graphical user interface of a downstream device, the matched canonical view.

In another aspect, a method for automatically extracting canonical views from ultrasound imaging data includes acquiring, using at least a transducer, ultrasound data of at least a structure, receiving, using at least a processor communicatively connected to the at least a transducer, the ultrasound data from the at least a transducer, classifying, using an extractor, a plurality of canonical views, wherein classifying the plurality of canonical views comprises identifying, using the extractor, a plurality of initial canonical views, generating, using the extractor, a plurality of comparisons of the plurality of initial canonical views to a plurality of reference canonical views, and classifying, using the extractor, the plurality of initial canonical views as matching canonical views and non-matching canonical views as a function of the plurality of comparisons, extracting, using the extractor, a matched canonical view, from the initial canonical views that are classified as matching canonical views as a function of a similarity metric, and displaying, using a graphical user interface of a downstream device, the matched canonical view.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for automatically extracting canonical views from ultrasound imaging data. The apparatus includes at least a computing device comprised of a processor and a memory communicatively connected to the processor. The memory instructs the processor to receive the ultrasound data from the at least a transducer. The processor classifies, using an extractor, a plurality of canonical views, wherein classifying the plurality of canonical views comprises identifying, using the extractor, a plurality of initial canonical views, generating, using the extractor, a plurality of comparisons of the plurality of initial canonical views to a plurality of reference canonical views, and classifying, using the extractor, the plurality of initial canonical views as matching canonical views and non-matching canonical views as a function of the plurality of comparisons. The processor extracts, using the extractor, a matched canonical view, from the initial canonical views that are classified as matching canonical views as a function of a similarity metric. The memory then instructs the processor to display, using a graphical user interface of a downstream device, the matched canonical view.

Figure 1:
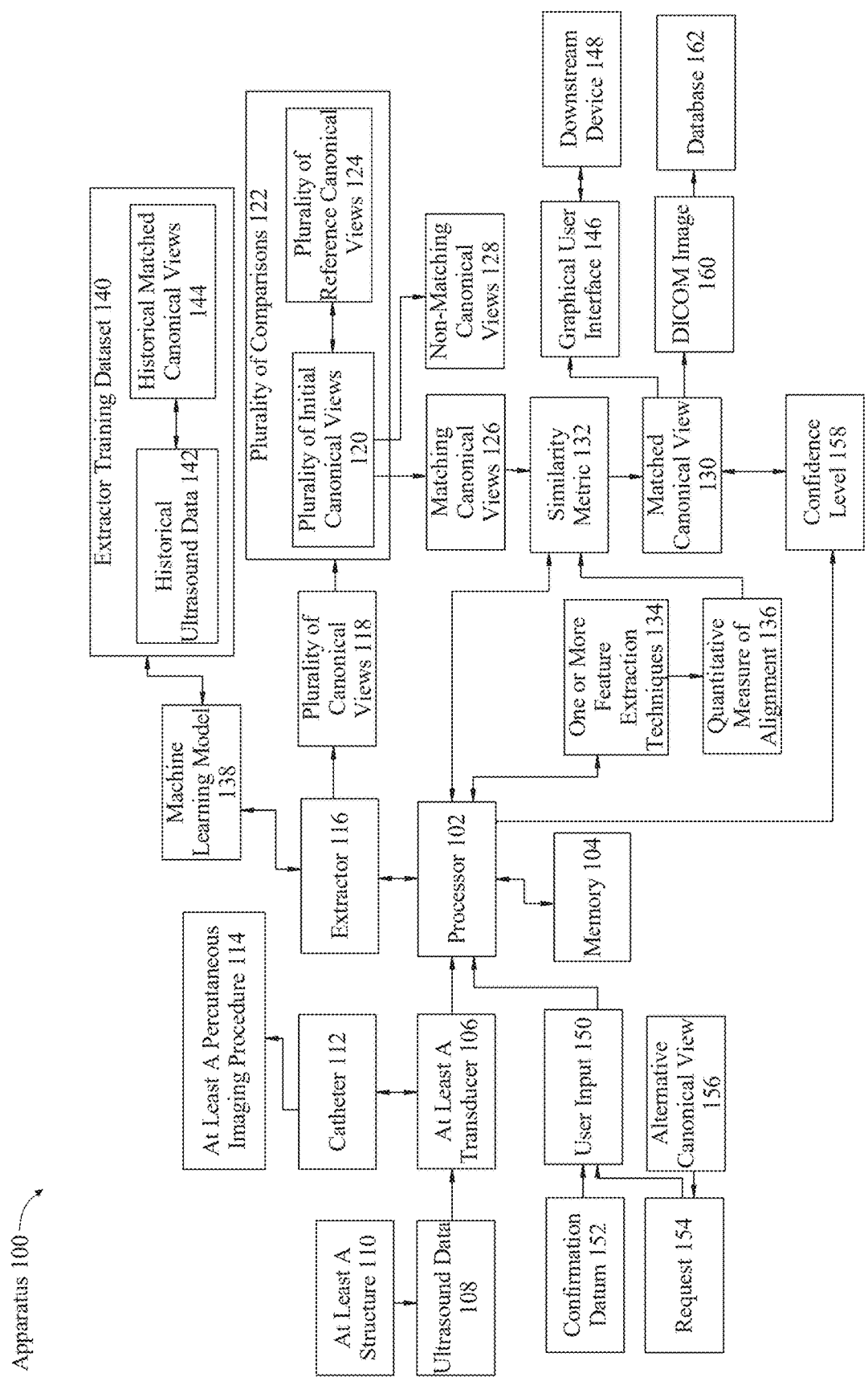
FIG. 1 is a block diagram of an apparatus for automatically extracting canonical views from ultrasound imaging data.

Referring now to FIG. 1, an exemplary embodiment of apparatus 100 for automatically extracting canonical views from ultrasound imaging data is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, the apparatus 100 includes at least a transducer 106 configured to acquire ultrasound data 108 of at least a structure 110. With continued reference to FIG. 1, for the purposes of this disclosure, a "transducer" is a device used to transform one kind of energy into another. When a transducer 106 converts a quantity of energy to an electrical voltage or an electrical current it may be called a sensor. A measurable quantity of energy may include sound pressure, optical intensity, magnetic field intensity, thermal pressure, etc. When a transducer 106 converts an electrical signal into another form of energy such as sound, light, mechanical movement, it is called an actuator. It should be noted that sound is incidentally a pressure field. Actuators allow the use of feedback at the source of the measurements.

With continued reference to FIG. 1, as used in this disclosure, "ultrasound data" data generated by an ultrasound transducer. In an embodiment, the raw or processed information may be obtained during the transmission and reception of sound waves. Without limitation, the ultrasound data 108 may include the reflected echoes from tissue interfaces, which are captured and converted into electrical signals for further processing. The ultrasound data 108 may be used to construct visual representations of anatomical structures 110, measure tissue properties, and analyze physiological functions in medical imaging applications.

With continued reference to FIG. 1, a sensor may be considered as a component or with a collection of electronics such as amplifiers, decoders, filters, computer devices and the apparatus 100. For the purposes of this disclosure an "instrument" is a sensor bundled with its associated electronics. However, in some embodiments, sensors may be further integrated with the apparatus 100. For example, without limitation, a robotic framework may include one or more sensors.

With continued reference to FIG. 1, a sensor integrated with the apparatus 100 may be linear so that response y to a stimulus x is in the form: $y(x)=Ax$, $0 \leq x \leq x_{max}$, $A>0$. It should be noted, there is a presumption that the stimulus to be positive. A is the sensitivity of the transducer 106 gain, or the gain of the sensor. The gain is presumed to be positive for which the linear model satisfies the definition of linearity: $y(x+z)=A(x+z)=y(x)+y(z)$. It should be noted that this example is an idealized form of a sensor and may extend beyond the linearity constraints which may include time dependency, memory, and its output keeping track of input. A more generalized sensor may include the steady state transfer function of the sensor. For this case, the sensitivity can be defined as the derivative of the output with respect to the input:

$$S = \frac{\partial y}{\partial x}.$$

In this example, the sensor exhibits sensitivities to other operating parameters (i.e. supply voltage) or temperature. For the purposes of this disclosure, "sensitivity" is the ratio of output to input. This can include electrical output and signal input or an input transducer. It can also include physical output to an electrical input, or an output transducer. Sensitivity can also be used in its usual electrical meaning. In this it would refer to a percent change of a property of a device because of a percent change in a parameter. In some embodiments this would be a percent change in gain as a result of percent change in ambient temperature. This type of sensitivity may be referred to as the Gain of a sensor.

Still referring to FIG. 1, the apparatus 100 with integrated sensors may not respond to arbitrarily small signals. The apparatus 100 may respond to signals within a specified range from zero to a sensor threshold which does not cause the output of the sensor to change. The existence of a threshold relates to the nonlinear behavior of the device and the noise. The apparatus 100 with an integrated sensor may fail to respond to stimuli which are arbitrarily large as well. In this case, the apparatus 100 integrated with a sensor may have a max range. The full range of the apparatus 100 integrated with a sensor may be limited by compression or clipping. Compression and clipping are results of nonlinearity and thus may include the apparatus 100 as a nonlinearity device.

Still referring to FIG. 1, referring to the linear equation above assuming a linear sensor is improved with the addition of a constant: $y(x)=b_0+Ax$. It should be noted that the equation is not linear even though it is described as a first order polynomial. The constant is called a zero offset and can be defined in two ways: a sensor reading when the input is zero, or the value of the stimulus required to make the output zero. The zero offset is corrected by subtracting $b_0$ from y and recovering the linear description of a sensor: $y'(x)=y(x)-b_0=Ax$.

With continued reference to FIG. 1, the transducer 106 may perform very fast measurements and may be configured to internally store energy. The apparatus 100 output may depend on previous measurements the integrated sensors make. It should be noted that the sensor may exhibit memory. The time dependence of a sensor can be linear if the response is described by a linear differential equation:

$$\sum_{n=0}^{N} A_n \frac{\partial^n y}{\partial t^n} = \sum_{k=0}^{k} B_k \frac{\partial^k x}{\partial t^k}.$$

Taking the Laplace transform of this equation:

$$y(s, X) = \left( \frac{\sum_{k=0}^{K} B_k S^k}{\sum_{n=0}^{N} A_n S^n} \right) x = H(s)X(s),$$

which is in Laplace transform space and the sensor response is still linear in stimulus x. The response of a sensor with a transfer function H(s) at time t is the convolution integral between the history of the stimulus x and the inverse Laplace transform h(t) of H(s):

$$y(t) = \int_0^\infty h(\tau)x(t-\tau)d\tau.$$

The apparatus 100 may behave like a low pass filter, wherein there is a delayed response to their input. There is a limit to the maximum stimulus frequency that can be detected. The maximum frequency a sensor can interpret is approximately the inverse of its response time.

With continued reference to FIG. 1, in an embodiment, the at least a transducer 106 may convert one form of energy into another for the purpose of sensing, measurement, or signal generation. In a non-limiting example, the at least a transducer 106 may be configured to convert electrical signals into ultrasonic waves and vice versa, enabling it to transmit and receive acoustic energy for imaging or therapeutic purposes. The transducer 106 may include piezoelectric elements, which generate ultrasonic signals when electrically stimulated, and detect returning echoes to provide data for creating detailed images of internal structures 110. In an embodiment, the transducer 106 may include an ultrasonic transducer. As used in this disclosure, an "ultrasonic transducer" is a device that converts electrical energy into ultrasonic waves and ultrasonic waves back into electrical energy for purposes such as imaging, measurement, or therapeutic applications. In a non-limiting example, an ultrasonic transducer may utilize piezoelectric elements that vibrate when an electrical signal is applied, generating high-frequency sound waves that propagate through a medium. The transducer 106 may then detect echoes of these waves reflected from structures 110 within the medium and convert them into electrical signals, which can be processed to generate images or provide diagnostic information. In an embodiment, the ultrasonic transducer may create ultrasound images by generating and detecting ultrasonic waves. As used in this disclosure, an "ultrasound image" is a visual representation generated by reflection of high-frequency sound waves off internal body structures 110. In a non-limiting example, ultrasound image may include visual representation of a heart examined through esophagus. As a non-limiting example, ultrasound image may include distance between sensor and surrounding tissue or organs. In some cases, ultrasound transducer may detect ultrasound image in a plurality of angles. In a non-limiting example, ultrasound image may include a plurality of distances between sensor and a heart in different angles. For example, and without limitation, when ultrasound transducer moves around within an esophagus, ultrasound transducer receives a plurality of distances between ultrasound transducer and organ and generate ultrasound image using the plurality of distances. As another non-limiting example, ultrasound transducer may include signal strength or amplitude of ultrasonic signal emitted and received by ultrasound sensor, images within an organ, or the like. As another non-limiting example, ultrasound transducer may include ambient temperature, humidity, atmospheric pressure, or the like. In some embodiments, ultrasound transducer may be stored in a database. In some embodiments, ultrasound image may be retrieved from database. In some embodiments, user may manually input ultrasound image. In some embodiments, ultrasound image may be received from remote device. As a non-limiting example, processor 102 may receive ultrasound transducer from a computing device or processor 102 incorporated with ultrasound transducer or TEE apparatus.

With continued reference to FIG. 1, in a non-limiting example, the transducer 106 may incorporate capacitive micromachined ultrasonic transducer (CMUT) technology, which utilizes microscopic membranes to generate and receive ultrasonic waves. This configuration may allow the transducer 106 to operate at higher frequencies, enabling enhanced resolution for imaging applications such as intravascular ultrasound (IVUS) or other minimally invasive procedures. The transducer 106 may be operatively coupled to a catheter 112, permitting real-time imaging of internal structures 110 such as blood vessels, cardiac tissues, or other anatomical regions. As used in this disclosure, a "catheter" is a medical device designed to be inserted into a body to facilitate diagnostic, therapeutic, or interventional procedures. Catheters may include biocompatible materials such as polyurethane, silicone, or polyethylene and may include various sizes, lengths, and configurations. In a non-limiting example, a catheter 112 may be used to introduce imaging devices, such as ultrasonic transducers, into blood vessels to capture internal anatomical information or to deliver medical treatments, such as medications or interventional tools, to targeted regions. The catheter 112 may include features such as sensors, guide wires, or lumens to support its specific medical application. A catheter 112 can be inserted into a coronary artery with an empty balloon and a stent attached to the end. For the purposes of this disclosure, a "stent" is a medical device designed to be implanted within a bodily lumen to restore or maintain openness by providing structural support. Stents may include tubular in shape and may include biocompatible materials such as stainless steel, cobalt-chromium alloys, nitinol (a shape-memory alloy), or biodegradable polymers. In a non-limiting example, the robotic framework may include a multi-axis robotic arm operatively connected to a catheter 112 coupled to an ultrasonic transducer. Continuing, the transducer 106 may be configured to emit and receive a plurality of ultrasonic signals to capture detailed imaging data of a structure 110, as discussed in more detail below, within the body. For instance, without limitation, the robotic framework may control the precise positioning of the catheter 112 to navigate through blood vessels and optimize the orientation of the transducer 106 for improved imaging quality. Without limitation, this configuration may enable real-time acquisition of three-dimensional (3D) models of anatomical structures 110, such as vascular walls or cardiac tissues, facilitating diagnostic or therapeutic procedures, as discussed more herein. In another non-limiting example, the robotic framework may incorporate feedback from a localization system, as discussed below, to dynamically adjust the position of the catheter 112 and the transducer 106 in response to changes in the structure 110. Continuing, the transducer 106, configured to receive a plurality of ultrasonic signals, may collect data that is processed by a computing device to refine imaging outputs or guide the movements of the robotic framework. For example, the apparatus may adaptively adjust the trajectory of the catheter 112 to maintain continuous imaging of a moving target, such as a beating heart or blood flow, ensuring accurate data collection and enhanced procedural outcomes.

With continued reference to FIG. 1, as used in this disclosure, "image data" is digital or analog information representing visual depictions of a structure 110, subject, or environment. The image data may be generated through medical imaging techniques such as ultrasound, MRI, CT, X-ray, or other modalities and may include raw or processed data used for analysis, reconstruction, or diagnostic interpretation. The image data may include pixel-based representations, volumetric datasets, or multi-dimensional reconstructions that facilitate visualization, measurement, and computational processing of anatomical or mechanical structures 110.

With continued reference to FIG. 1, as used in this disclosure, a "structure" is a physical arrangement of components that forms an identifiable entity. For example, without limitation, the identifiable entity may include an anatomical features such as the heart, blood vessels, bones, muscles, soft tissues, and the like, as well as complex organ systems, connective tissues, and other physiological components that contribute to the function and integrity of a living organism. The structure 110 may encompass specialized biological formations such as cartilage, ligaments, tendons, neural networks, and the like, which play critical roles in movement, support, and signal transmission. Additionally and or alternatively, the structure 110 may include microscopic or macroscopic elements, such as cellular matrices, extracellular scaffolding, or structural proteins that provide mechanical strength and biochemical functionality. The structure 110 may encompass medical implants, prosthetic devices, or other man-made constructs introduced into the body for therapeutic or diagnostic purposes.

With continued reference to FIG. 1, the at least a structure 110 may include a heart. As used in this disclosure, a "heart" is an organ responsible for pumping blood through the circulatory system. Without limitation, the heart may include chambers, valves, blood vessels, and associated structures 110 that regulate the direction and efficiency of blood flow. In an embodiment, the at least a structure 110 may include a heart, which may be depicted as a central anatomical component within the system being analyzed or imaged. Continuing, the heart may be shown in relation to surrounding structures 110, such as major blood vessels, valves, or adjacent tissues, to facilitate visualization, diagnosis, or procedural guidance. In another embodiment, the heart may be assessed for structural integrity, functional performance, or pathological conditions using imaging, computational modeling, or interventional techniques.

In an embodiment, the apparatus 100 may further include a catheter 112 coupled to the at least a transducer 106, wherein the catheter 112 is configured to be used for at least a percutaneous imaging procedure 114. As used in this disclosure, a "catheter" is a medical device designed for insertion into a body. In an embodiment, the catheter 112 may be rigid or flexible. In an embodiment, the catheter 112 may be inserted into the body to perform various diagnostic or therapeutic functions. In an embodiment, the catheter 112 may be used for fluid drainage, medication delivery, and/or as a conduit for imaging and interventional tools. As used in this disclosure, a "percutaneous imaging procedure" is an invasive diagnostic technique in which imaging equipment is introduced into the body using an incision. In an embodiment, the imaging equipment may include ultrasound or optical coherence tomography. In an embodiment, the percutaneous imaging procedure 114 may enable real-time visualization of internal structures 110, often assisting in the guidance of interventional treatments.

With continued reference to FIG. 1, in a non-limiting example, the catheter 112 may incorporate an intracardiac echocardiography (ICE) transducer 106 to provide real-time, high-resolution imaging of cardiac structures 110 during interventional procedures. Continuing, the ICE catheter 112 may be inserted percutaneously into a vein, such as the femoral or jugular vein, and advanced into the heart to visualize intracardiac anatomy, assess valvular function, or guide catheter-based interventions. The apparatus 100 may facilitate electrophysiology procedures, such as atrial fibrillation ablation, by offering direct visualization of the cardiac chambers and pulmonary vein ostia. Additionally and/or alternatively, the catheter 112 may be configured to assist in structural heart interventions, such as transcatheter mitral or tricuspid valve repair, by enabling precise positioning of repair devices. In another embodiment, the catheter 112 may be used for monitoring percutaneous closure of atrial septal defects (ASDs) or patent foramen ovale (PFO), allowing for real-time confirmation of device placement and post-procedural assessment. Furthermore, the ICE catheter 112 may be employed in guiding left atrial appendage occlusion (LAAO) procedures, where accurate visualization of device deployment is critical for procedural success. The catheter 112 may also integrate Doppler imaging capabilities to evaluate hemodynamics and blood flow patterns within the heart, enhancing procedural safety and efficiency. In a non-limiting example, the catheter 112 may incorporate an intravascular ultrasound (IVUS) transducer 106 to capture high-resolution images of blood vessels, facilitating the assessment of arterial plaque or stenosis. Additionally and/or alternatively, the catheter 112 may include an OCT imaging component to provide detailed cross-sectional views of vascular or other soft tissues, assisting in precision-guided interventions.

Still referring to FIG. 1, processor 102 is configured to receive the ultrasound data 108 from the at least a transducer 106. In an embodiment, the processor 102 may apply signal conditioning techniques, such as filtering and beamforming, to enhance image quality and reduce noise. Additionally, processor 102 may execute algorithms to generate real-time visualizations of anatomical structures 110 based on the received ultrasound data 108. The processor 102 may further analyze the ultrasound signals to detect specific features, such as tissue boundaries or fluid flow patterns, aiding in diagnostic assessments. In some embodiments, processor 102 may integrate artificial intelligence or machine learning models to enhance image interpretation and automate anomaly detection.

Still referring to FIG. 1, processor 102 is configured to classify, using an extractor 116, a plurality of canonical views 118, wherein classifying the plurality of canonical views 118 comprises identifying, using the extractor 116, a plurality of initial canonical views 120, generate, using the extractor 116, a plurality of comparisons 122 of the plurality of initial canonical views 120 to a plurality of reference canonical views 124, and classify, using the extractor 116, the plurality of initial canonical views 120 as matching canonical views 126 and non-matching canonical views 128 as a function of the plurality of comparisons 122. As used in this disclosure, an "extractor" is a model or set of models or software functions configured to process ultrasound data 108 for classification. In an embodiment, the extractor 116 may analyze ultrasound data 108 to detect anatomical structures 110, enhance image quality, or extract key imaging parameters used in subsequent classification tasks. As used in this disclosure, "canonical views" are standardized imaging perspectives and/or orientations that provide a consistent visualization of structures 110. In an embodiment, the plurality of canonical views 118 may correspond to specific imaging planes, such as longitudinal, transverse, or oblique sections, that are used to evaluate anatomical features with minimal variability. In a non-limiting example, the plurality of canonical views 118 may include views of the heart, including an apical four-chamber view, a parasternal long-axis view, and a subcostal view, to ensure uniform assessment of cardiac function. In another non-limiting example, the plurality of canonical views 118 of coronary arteries at predefined cross-sectional levels may be used to evaluate plaque morphology and vessel dimensions. Additionally and or alternatively, the plurality of canonical views 118 may include views of joints, tendons, and ligaments, such as a transverse view of the rotator cuff or a longitudinal view of the Achilles tendon, for diagnostic consistency. In a non-limiting example, an automated imaging algorithm may adjust probe orientation to align with canonical views, ensuring that images are acquired in a standardized manner across different operators and clinical settings.

With continued reference to FIG. 1, as used in this disclosure, "initial canonical views" are a subset of canonical views identified from ultrasound data 108 that are candidates for further comparison. In an embodiment, the further comparison may be against the plurality of reference canonical views 124. The initial canonical views may be selected based on image quality, anatomical relevance, or similarity to predefined imaging criteria. As used in this disclosure, "reference canonical views" are predefined imaging perspectives that serve as a baseline for comparison. In an embodiment, the reference canonical views may be derived from expert-labeled datasets, clinical guidelines, or prior imaging studies and are used to assess the accuracy or consistency of initial canonical views. As used in this disclosure, "matching canonical views" are initial canonical views that have been classified as sufficiently similar or identical to reference canonical views based on predefined criteria. In an embodiment, the matching canonical views 126 may indicate a successful alignment of imaging perspectives, confirming that the ultrasound data 108 corresponds to expected anatomical structures 110. As used in this disclosure, "non-matching canonical views" are initial canonical views that do not meet the similarity criteria when compared to reference canonical views. In an embodiment, the non-matching canonical views 128 may indicate misalignment, poor imaging quality, or anatomical variations that require further adjustment or analysis.

With continued reference to FIG. 1, as used in this disclosure, "comparisons" are the process of evaluating similarities or differences between the plurality of initial canonical views 120 and the plurality of reference canonical views 124. In an embodiment, the plurality of comparisons 122 may use quantitative or qualitative metrics. In an embodiment, the plurality of comparisons 122 may involve image registration, feature matching, statistical analysis, machine learning models, and the like to assess the degree of correspondence between the plurality of initial canonical views 120 and the plurality of reference canonical views 124 and classify them as matching canonical views 126 or non-matching canonical views 128. In an embodiment, each frame of the ultrasound data 108 may be classified to a "closest possible" canonical view. For example, without limitation, a frame showing the left ventricle in long-axis orientation may be classified as a parasternal long-axis view, while a frame capturing the mitral and aortic valves in cross-section may be classified as a parasternal short-axis view. Continuing, additional frames depicting the four chambers of the heart may be classified to an apical four-chamber view. Without limitation, a frame capturing all four cardiac chambers, including the left and right atria and ventricles, from the apex of the heart may be classified as an apical four-chamber view. In another embodiment, without limitation, a frame illustrating the left ventricle outflow tract along with the aortic valve and ascending aorta may be classified as an apical long-axis view. Without limitation, a frame centered on the right ventricle inflow and tricuspid valve may be matched to a right ventricular inflow view. Similarly, without limitation, a frame revealing the pulmonary artery bifurcation may be classified as a suprasternal view, and a frame showing the inferior vena cava entering the right atrium may correspond to a subcostal view. In a non-limiting example, a deep learning-based algorithm may process a recorded ultrasound sweep to automatically extract frames that correspond to known canonical views of the heart. For each extracted frame, a classification model may determine the most similar canonical view by analyzing anatomical features and spatial orientation. Continuing, to refine the selection, a similarity scoring system may evaluate how closely each frame matches a given canonical view, allowing the system to rank frames based on confidence level and clinical relevance. The highest-scoring frames may be selected as representative images for each standard view, enabling streamlined review and consistent diagnostic interpretation.

With continued reference to FIG. 1, in an embodiment, the at least a processor 102 may be configured to classify the plurality of canonical views 118 by utilizing an extractor 116 to analyze ultrasound data 108 and detect anatomical structures 110. The extractor 116 may identify a plurality of initial canonical views 120 by applying pattern recognition techniques, such as edge detection and machine learning-based segmentation, to determine candidate imaging planes. For example, without limitation, in a cardiac ultrasound system, the extractor 116 may identify initial canonical views corresponding to an apical four-chamber view or a parasternal long-axis view based on detected anatomical landmarks. In an embodiment, the processor 102 may generate a plurality of comparisons 122 between the initial canonical views and a predefined set of reference canonical views, which may be derived from expert-labeled datasets or clinical imaging standards. In a non-limiting example, the comparisons may involve feature matching techniques, such as structural similarity analysis, to assess whether an initial view sufficiently aligns with a reference view of the left ventricle. Continuing, based on the plurality of comparisons 122, the processor 102 may classify the initial canonical views as matching canonical views 126 if they meet similarity thresholds, ensuring consistency in imaging interpretation. Additionally and/or alternatively, if significant discrepancies are detected, such as poor alignment or missing anatomical landmarks, the processor 102 may classify the initial canonical views as non-matching canonical views 128, prompting realignment or reacquisition of the ultrasound data 108.

With continued reference to FIG. 1, as used in this disclosure, "edge detection" is a computational technique used to identify and delineate the boundaries of objects within an image by detecting abrupt changes. In an embodiment, the edge detection may use the abrupt changes in the image such as intensity or color gradients. In an embodiment, the image may comprise images generated by the at least a transducer 106 of the structure 110. In an embodiment, the edge detection may be implemented using algorithms such as the Sobel operator, Canny edge detector, or Laplacian of Gaussian (LoG), which analyze pixel intensity variations to highlight structural contours. In an embodiment, edge detection may be applied to ultrasound images to enhance the visualization of anatomical features, such as the borders of cardiac chambers, vascular walls, or tissue interfaces. In a non-limiting example, an ultrasound processing system may use edge detection to refine the contours of a left ventricle in echocardiographic imaging, aiding in accurate measurement of ejection fraction. Additionally, edge detection may assist in identifying discontinuities in tissue structures 110, such as detecting plaques in vascular imaging or delineating tumor margins in oncological ultrasound assessments.

With continued reference to FIG. 1, as used in this disclosure, "machine-learning-based segmentation" is a computational process that employs machine learning models to partition an image into meaningful regions. In an embodiment, the regions of the image machine-learning-based segmentation may be based on learned patterns, features, or pixel classifications. In an embodiment, the machine-learning-based segmentation may involve supervised, unsupervised, or deep learning approaches, such as convolutional neural networks (CNNs) or U-Net architectures, to differentiate anatomical structures 110, tissues, or abnormalities in medical imaging. In an embodiment, machine-learning-based segmentation may be used to automatically distinguish cardiac chambers, vascular structures 110, or lesions from surrounding tissues in ultrasound images. In a non-limiting example, a deep learning model may segment the endocardial and epicardial borders of the left ventricle in real-time echocardiographic imaging, facilitating automated assessment of myocardial function. Additionally, machine-learning-based segmentation may be employed in intravascular ultrasound (IVUS) imaging to differentiate vessel lumen from plaque buildup, assisting in the evaluation of arterial stenosis and guiding interventional procedures.

With continued reference to FIG. 1, the apparatus 100 may use traditional computer vision techniques, such as the Scale-Invariant Feature Transform (SIFT). In an embodiment, SIFT may be applied to the ultrasound data 108 to detect and describe distinctive local features across individual frames. Without limitation, each frame of ultrasound data 108 may be processed to identify keypoints that are invariant to scale and rotation, which may be useful in handling the variability inherent in freehand ultrasound acquisition. Continuing, without limitation, the keypoints may be localized and assigned orientations before generating gradient-based descriptors. Gradient-based descriptors may be used to compare frames of ultrasound data 108 against a reference dataset of canonical views to identify the "closest possible" match. Without limitation, the robustness of SIFT to illumination changes and geometric distortion makes it a strong candidate for consistent feature extraction in noisy ultrasound environments. Additionally and/or alternatively, the Histogram of Oriented Gradients (HOG) technique may be utilized to capture and quantify the structural shape information present in the ultrasound data 108. Each frame may be divided into cells in which local gradient orientations are analyzed to construct histograms that represent the underlying anatomical structure 110. Continuing, without limitation, these histograms may then be normalized across blocks to enhance contrast invariance, which can help account for varying image acquisition conditions. The HOG process may generate a stable feature vector for each frame, allowing for effective comparison against labeled canonical view templates. When combined with similarity scoring, the HOG descriptors may facilitate automated identification and sorting of ultrasound frames into relevant clinical views. However, while traditional methods offer interpretability and efficiency, they may lack the capacity to fully capture the complex variability present in echocardiographic data. Without limitation, to address the complex variability in echocardiographic data, deep learning-based feature extraction may be employed using Convolutional Neural Networks (CNNs), which are capable of automatically learning hierarchical features from raw ultrasound data 108. Without limitation, the system may train the CNN on a labeled dataset of canonical heart views. This may permit the network to learn to extract features that are semantically rich and anatomically meaningful. Continuing, without limitation, these features may be used not only to classify frames into predefined views but also to cluster similar cardiac structures 110 across different patients, providing a powerful tool for real-time ultrasound interpretation. In this embodiment, each frame of ultrasound data 108 may be passed through the trained CNN, producing high-dimensional feature representations. These representations may then be compared using distance metrics such as cosine similarity or Euclidean distance to determine the most likely canonical view match. The learned features may be visualized or analyzed further to assess which anatomical regions contributed most to the classification, offering insight into both the model's decision process and the underlying cardiac anatomy. Without limitation, one or more CNNs may adapt to various imaging artifacts and noise patterns common in ultrasound. This may make CNNs particularly well-suited for this domain.

Continuing, the combined use of traditional feature extraction methods and deep learning approaches may enhance the robustness and accuracy of ultrasound data analysis. For example, methods like SIFT and HOG may provide explainable and computationally efficient ways to extract structural 110 features, CNNs offer adaptability and depth in learning complex anatomical variations. When applied in tandem or as complementary components of a hybrid pipeline, these techniques may significantly improve the classification of ultrasound frames to canonical views, thereby streamlining the clinical workflow and supporting automated decision-making in cardiac imaging.

Still referring to FIG. 1, processor 102 is configured to extract, using the extractor 116, a matched canonical view 130, from the initial canonical views that are classified as matching canonical views 126 as a function of a similarity metric 132. As used in this disclosure, "matched canonical view" is a canonical view that has been extracted from a set of initial canonical views and classified as a matching canonical view based on a similarity metric 132. In an embodiment, the matched canonical view 130 may represent an imaging perspective that aligns with a reference canonical view, ensuring consistency in visualization and analysis of anatomical structures 110. As used in this disclosure, "similarity metric" is a quantitative measure used to assess the degree of correspondence between two or more images or sets of data. In an embodiment, the two or more images may include the plurality of initial canonical views 120 and the plurality of reference canonical views 124. In an embodiment, the similarity metrics 132 may include structural similarity index (SSIM), mean squared error (MSE), normalized cross-correlation, deep learning-based feature matching techniques, and the like. In an embodiment, the processor 102 may analyze ultrasound data 108 and compare the plurality of initial canonical views 120 to the plurality of reference canonical views 124 using structural similarity or intensity-based correlation techniques. In a non-limiting example, the processor 102 may assess the alignment of an apical four-chamber view in echocardiographic imaging by evaluating pixel-wise similarity and anatomical feature correspondence against a predefined reference view, such as the plurality of reference canonical views 124. Continuing, if an initial canonical view meets a predefined similarity threshold, it may be classified as the matched canonical view 130, ensuring that the extracted image adheres to clinical or diagnostic standards. Additionally and/or alternatively, the processor 102 may apply machine learning algorithms to refine the similarity metric 132, adapting the classification criteria based on real-time variations in imaging quality or patient anatomy. In a non-limiting example, if the plurality of initial canonical views do not meet the similarity threshold, the processor 102 may prompt reacquisition or realignment of the ultrasound probe to improve image consistency.

With continued reference to FIG. 1, extracting, using the extractor 116, the matched canonical view 130 may further include ranking, using the extractor 116, the plurality of initial canonical views 120 from highest similarity to lowest similarity based on the similarity metric 132. In an embodiment, extracting, using the extractor 116, the matched canonical view 130 may further include ranking, using the extractor 116, the plurality of initial canonical views 120 from highest similarity to lowest similarity based on the similarity metric 132. The ranking process may involve computing similarity scores for each initial canonical view in relation to a predefined set of reference canonical views and organizing them in descending order of similarity. In an embodiment, the extractor 116 may apply structural similarity index (SSIM), mean squared error (MSE), or normalized cross-correlation to quantify the resemblance between each initial canonical view and its corresponding reference canonical view. The processor 102 may then generate a ranked list, where the initial canonical view with the highest similarity score is positioned at the top and is more likely to be selected as the matched canonical view 130. For example, in echocardiographic imaging, the extractor 116 may analyze multiple initial views of the left ventricle and rank them based on their alignment with a reference four-chamber view, ensuring that the most diagnostically relevant image is selected. Additionally and/or alternatively, a deep-learning-based ranking methods may be implemented, where convolutional neural networks (CNNs) or other machine-learning algorithms assess similarity based on learned features such as anatomical landmarks, edge definitions, pixel intensity distributions, and the like. In a non-limiting example, the extractor 116 may analyze intravascular ultrasound (IVUS) images of coronary arteries and rank them based on how well they align with a reference lumen contour, facilitating automated selection of optimal cross-sectional views for stenosis evaluation. In another embodiment, the ranking process may be dynamic, allowing real-time adjustments based on imaging conditions such as probe angle, signal quality, or motion artifacts. If a highly ranked initial canonical view contains motion blur or shadowing artifacts, the processor 102 may assign a weighted penalty to its similarity score, prioritizing clearer and more diagnostically useful images. Furthermore, the extractor 116 may update rankings continuously as new initial canonical views are acquired, refining the selection process to ensure that the most precise matched canonical view 130 is identified for further analysis or procedural guidance.

With continued reference to FIG. 1, the at least a processor 102 may be further configured to generate the similarity metric 132 by computing, using one or more feature extraction techniques 134, a quantitative measure of alignment 136 between the initial canonical views and the reference canonical views. As used in this disclosure, "feature extraction techniques" are computational methods used to identify and isolate relevant characteristics from an image or dataset to facilitate analysis, classification, or comparison. In an embodiment, the feature extraction techniques 134 may include edge detection, texture analysis, keypoint detection, deep learning-based feature mapping, and the like, allowing for the identification of anatomical structures 110, spatial patterns, or intensity variations. In an embodiment, feature extraction techniques 134 may be applied to ultrasound images to enhance the visibility of tissue boundaries, vessel contours, or organ morphology, supporting accurate classification and alignment assessments. As used in this disclosure, "quantitative measure of alignment" is a numerical value that represents the degree to which two or more images correspond. In an embodiment, correspondence may be in terms of spatial positioning, structural similarity, feature consistency, and the like. In an embodiment, the quantitative measure of alignment 136 may be computed using metrics such as structural similarity index, mean squared error, normalized cross-correlation, transformation-based alignment scores, and the like. In an embodiment, the quantitative measure of alignment 136 may be used to assess how closely the initial canonical view matches the reference canonical view, ensuring image consistency for diagnostic or procedural purposes. In an embodiment, the processor 102 may apply edge detection algorithms, such as the Canny operator, to both the initial canonical views and reference canonical views, identifying key structural boundaries for comparison. In a non-limiting example, the processor 102 may use keypoint detection methods, such as scale-invariant feature transform (SIFT), to extract distinctive features from echocardiographic images and compare their spatial distribution to reference cardiac views. Additionally and or alternatively, the processor 102 may compute the similarity metric 132 based on pixel intensity correlations, where normalized cross-correlation evaluates the alignment between grayscale patterns in vascular ultrasound imaging. In another embodiment, deep learning-based feature extraction techniques 134 may be employed, where a convolutional neural network (CNN) processes image data to learn and compare complex anatomical features between the initial and reference views. The computed similarity metric 132 may then be used to rank initial canonical views based on their degree of alignment, ensuring that the most relevant matched canonical view 130 is identified for further analysis or procedural guidance.

With continued reference to FIG. 1, the extractor 116 may include a machine-learning model 138, wherein the machine-learning model 138 is trained using an extractor training dataset 140, wherein the extractor training dataset 140 comprises historical ultrasound data 142 associated with historical matched canonical views 144. As used in this disclosure, "extractor training dataset" is a collection of structured data used to train a machine-learning model 138 within the extractor 116. In an embodiment, the extractor training dataset 140 may include labeled examples that enable the machine-learning model 138 to learn patterns, features, and relationships necessary for accurately identifying, segmenting, or classifying matched canonical views. The extractor training dataset 140 may be composed of historical ultrasound data 142 and historical matched canonical views 144, along with corresponding annotations, metadata, or validation metrics.

With continued reference to FIG. 1, as used in this disclosure, "historical ultrasound data" is previously acquired ultrasound imaging data. In an embodiment, the historical ultrasound data 142 may be stored, used for reference, analysis, and/or training purposes. In an embodiment, the historical ultrasound data 142 may include raw ultrasound scans, preprocessed images, Doppler data, grayscale or color flow images, and/or volumetric 3D/4D reconstructions. This historical ultrasound data 142 may include associated metadata such as imaging parameters (e.g., frequency, gain, depth), patient demographics, or acquisition conditions that help contextualize its usage in training. As used in this disclosure, "historical matched canonical views" are instances of previously identified and validated canonical views that have been successfully extracted from historical ultrasound data 142. In an embodiment, the historical matched canonical views 144 may serve as ground truth references in the extractor training dataset 140, allowing the machine-learning model 138 to learn which anatomical structures, orientations, or imaging characteristics define an accurate canonical view. Historical matched canonical views 144 may include confidence scores, similarity metrics 132, or expert-validated annotations to further refine the training process.

Still referring to FIG. 1, processor 102 is configured to display, using a graphical user interface 146 of a downstream device 148, the matched canonical view 130. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 146. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface 146 and an event handler may operate together to enable seamless interaction between the user and the apparatus 100. The GUI serves as the visual and interactive layer through which the user engages with the apparatus 100, presenting elements such as buttons, sliders, input fields, and informational displays. The event handler, on the other hand, functions as the underlying mechanism that monitors and responds to user interactions with the GUI. For example, when a user clicks a button on the GUI to request an explanation of a concept, the event handler may detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI subsequently updates to reflect the system's responses, such as displaying output, modifying visual elements, or providing real-time feedback. Together, the GUI and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface 146. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the apparatus 100 and or the downstream device 148 may include a data structure. With continued reference to FIG. 1, as used in this disclosure, "data structure" is a way of organizing data represented in a specialized format on a computer configured such that the information can be effectively presented in a graphical user interface 146. In some cases, the data structure includes any input data. In some cases, the data structure contains data and/or rules used to visualize the graphical elements within a graphical user interface 146. In some cases, the data structure may include any data described in this disclosure. In some cases, the data structure may be configured to modify the graphical user interface 146, wherein data within the data structure may be represented visually by the graphical user interface 146. In some cases, the data structure may be continuously modified and/or updated by processor 102, wherein elements within graphical user interface 146 may be modified as a result. In some cases, processor 102 may be configured to transmit display device and or the downstream device 148 the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween.

Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI. The data structure may act as a bridge between the user's input, captured by the event handler, and the output displayed on the GUI, ensuring that information is handled efficiently and accurately throughout the interaction. For example, without limitation, when a user interacts with a dropdown menu in the GUI to select a topic, the event handler may capture this input and accesses a data structure, such as a dictionary or tree, that maps each topic to its associated resources or actions. The data structure may retrieve the relevant information such as, text explanations, videos, or interactive exercises, and passes it back to the event handler, which may then trigger the appropriate updates to the GUI, such as displaying the selected topic's content. In another embodiment, the data structure may also maintain the state of the system, tracking user progress, preferences, and session history. For instance, without limitation, a hash table may store user specific configurations, such as preferred learning styles or recent activity, which the event handler references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface 146 (GUI) that allows users to perform actions, provide input, or engage with the apparatus 100. Interactive elements may be designed to facilitate two-way communication between the user and the system, enabling the user to influence the behavior of the apparatus 100 or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data, such as a user's profile or quiz questions. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous JavaScript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 1, as used in this disclosure, "downstream device" is a device that accesses and interacts with apparatus 100. For instance, and without limitation, downstream device 148 may include a remote device and/or apparatus 100. In a non-limiting embodiment, downstream device 148 may be consistent with a computing device as described in the entirety of this disclosure. Without limitation, the downstream device 148 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display. Additionally and/or alternatively, processor 102 be connected to display device. In one or more embodiments, transmitting the matched canonical view 130 may include displaying the matched canonical view 130 at display device using a visual interface.

With continued reference to FIG. 1, the apparatus 100 further may include receiving, using the at least a processor 102, a user input 150 from the graphical user interface 146 and conditionally updating, using the at least a processor 102, the matched canonical view 130 as a function of the user input 150. As used in this disclosure, "user input" is information provided by a user through a graphical user interface 146. In an embodiment, the user input 150 may be received and processed by at least a processor 102 to conditionally update the matched canonical view 130. In an embodiment, the user input 150 may include system feedback. In an embodiment, the user input 150 may confirm the matched canonical view 130. In an embodiment, the user input 150 may reject the matched canonical view 130. In an embodiment, the user input 150 may override the matched canonical view 130. For example, without limitation, the user input 150 may confirm the matched canonical view 130 by selecting a confirmation button on the graphical user interface 146, indicating agreement with the presented view. In another example, the user input 150 may reject the matched canonical view 130 by selecting a "Reject" option, providing feedback that the current view does not align with the expected result. Additionally and or alternatively, the user input 150 may override the matched canonical view 130 by manually adjusting parameters, repositioning elements within the interface, or selecting an alternative canonical view 156 from a list of suggested options.

With continued reference to FIG. 1, the user input 150 may include a confirmation datum 152. As used in this disclosure, "confirmation datum" is data provided by the user input 150 that indicates approval, validation, or acceptance of a particular state, selection, or system-generated output. For example, without limitation, the confirmation datum 152 may be a binary signal (e.g., a "Yes" or "No" response), a digital signature, a selection of a confirmation checkbox, or an explicit acknowledgment button click. The confirmation datum 152 may serve as a trigger for the system to proceed with an operation, such as finalizing a matched canonical view 130. In some embodiments, the confirmation datum 152 may be stored as part of an audit log to maintain a record of user interactions and decisions. In an embodiment, the confirmation datum 152 serves as an explicit validation of the matched canonical view 130, ensuring that the user agrees with the system's determination or processing outcome. For instance, without limitation, if the apparatus 100 generates a matched canonical view 130 based on algorithmic analysis or data correlation, the user may provide a confirmation datum 152, such as selecting an "Accept" button, checking a confirmation box, or entering a validation code, to affirm that the generated view correctly represents the intended or expected result.

With continued reference to FIG. 1, the at least a processor 102 may be further configured to refine the matched canonical view 130 as a function of the user input 150, wherein refining the matched canonical view 130 comprises receiving, using the graphical user interface 146, a request 154 of the user input 150 and receiving, using the graphical user interface 146, an alternative canonical view 156 of the plurality of initial canonical views 120. As used in this disclosure, "request" is user input 150 that prompts the apparatus 100 to perform an operation. In an embodiment, the operation may include refining, modifying, and/or selecting an alternative canonical view 156. The request 154 may include, without limitation, a selection of an option, a typed command, a voice input, a gesture-based interaction, and the like, indicating the user's intent to refine or update the matched canonical view 130. As used in this disclosure, "alternative canonical view" is a different canonical view selected from the plurality of initial canonical views 120. The alternative canonical view 156 may be provided to the user as a selectable option when the matched canonical view 130 does not align with the user's expectations or preferences. Without limitation, upon detecting a mismatch between the matched canonical view 130 and the user's expectations, the apparatus 100 may provide an interface element, such as a dropdown menu, toggle switch, and/or dynamically suggested alternative, that enables the user to switch to an alternative canonical view 156. Continuing, this selectable alternative may be presented alongside explanatory information, comparative visual representations, or preview functionality to assist the user in determining whether the alternative canonical view 156 better aligns with their intended outcome. The alternative canonical view 156 may be preconfigured by system administrators, dynamically generated through algorithmic adjustments, or derived from a repository of previously validated alternative views. In an embodiment, the alternative canonical view 156 may be manually chosen by the user or suggested by the system based on predefined criteria, user behavior, or contextual analysis. Upon selection, the alternative canonical view 156 may replace, modify, or further refine the matched canonical view 130 to enhance accuracy, relevance, or usability.

With continued reference to FIG. 1, the extraction of the matched canonical view 130 may be a function of a confidence level 158. As used in this disclosure, a "confidence level" is a measure of certainty that a given outcome is correct. The confidence level 158 may be derived from various statistical, probabilistic, and/or machine learning models that assess the reliability of the extracted matched canonical view 130 based on underlying data patterns, algorithmic accuracy, predefined thresholds, and the like. For example, without limitation, the extraction of the matched canonical view 130 may be based on a confidence level 158 that indicates how closely the matched canonical view 130 aligns with expected parameters or the reference canonical view. In an embodiment, if a machine learning model processes the plurality of initial canonical views 120 and determines that the matching canonical view with a 95% confidence level 158, the apparatus 100 may automatically select that view to present to the user. However, if the confidence level 158 falls below a predefined threshold, such as 60%, the apparatus 100 may prompt the user to confirm or select an alternative canonical view 156. In another example, if the apparatus 100 utilizes computer vision to recognize objects in an image and extract a corresponding canonical view, the confidence level 158 may be calculated based on factors such as feature similarity, prior successful classifications, or algorithmic confidence scores. If a particular extraction yields a confidence level 158 of 85%, the apparatus 100 may proceed with presenting the matched canonical view 130. In another non-limiting example, if the confidence level 158 is only 40%, the apparatus 100 may trigger an alternative process, such as requesting additional user input 150, refining the extraction parameters, or presenting multiple potential matches with their associated confidence levels 158 for the user to manually determine which canonical view is the most closely matched view. Without limitation, the confidence level 158 may be dynamically adjusted based on real-time feedback. For instance, without limitation, if users frequently override the matched canonical view 130 despite high confidence levels 158, the apparatus 100 may recalibrate its confidence threshold to improve accuracy and user satisfaction by dynamically adjusting its decision-making criteria based on real-time feedback, historical user interactions, and machine learning-driven optimizations.

With continued reference to FIG. 1, the at least a computing device may be configured to save the matched canonical view 130 as a DICOM image 160 in a database 162. As used in this disclosure, "DICOM" (Digital Imaging and Communications in Medicine) is a standard for managing medical imaging data. In an embodiment, the DICOM image 160 may include both the image itself and metadata containing patient information, image acquisition parameters, and other relevant details. The DICOM standard may ensure interoperability between different medical imaging systems, allowing healthcare providers to store, retrieve, and share imaging data efficiently. As used in this disclosure, "metadata" is information that provides and meaning to primary data. Metadata may include attributes, identifiers, or other characteristics that facilitate the organization, retrieval, and interpretation of data. For example, without limitation, metadata may include patient information (e.g., name, age, and medical record number), imaging parameters (e.g., modality type, resolution, and scan date), system-generated details (e.g., unique identifiers, timestamps, and compression settings), and the like. Metadata may enable efficient indexing, searching, and processing of stored data within a database 162 or computing system.

With continued reference to FIG. 1, as used in this disclosure, a "database" is a collection of data that is managed using a computing system. The database 162 may organize and index data to facilitate efficient querying, retrieval, and manipulation. In an embodiment, the database 162 may store DICOM images 160 along with associated metadata, allowing the at least a computing device to access, update, and manage matched canonical views 130 for further processing, analysis, or clinical use.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
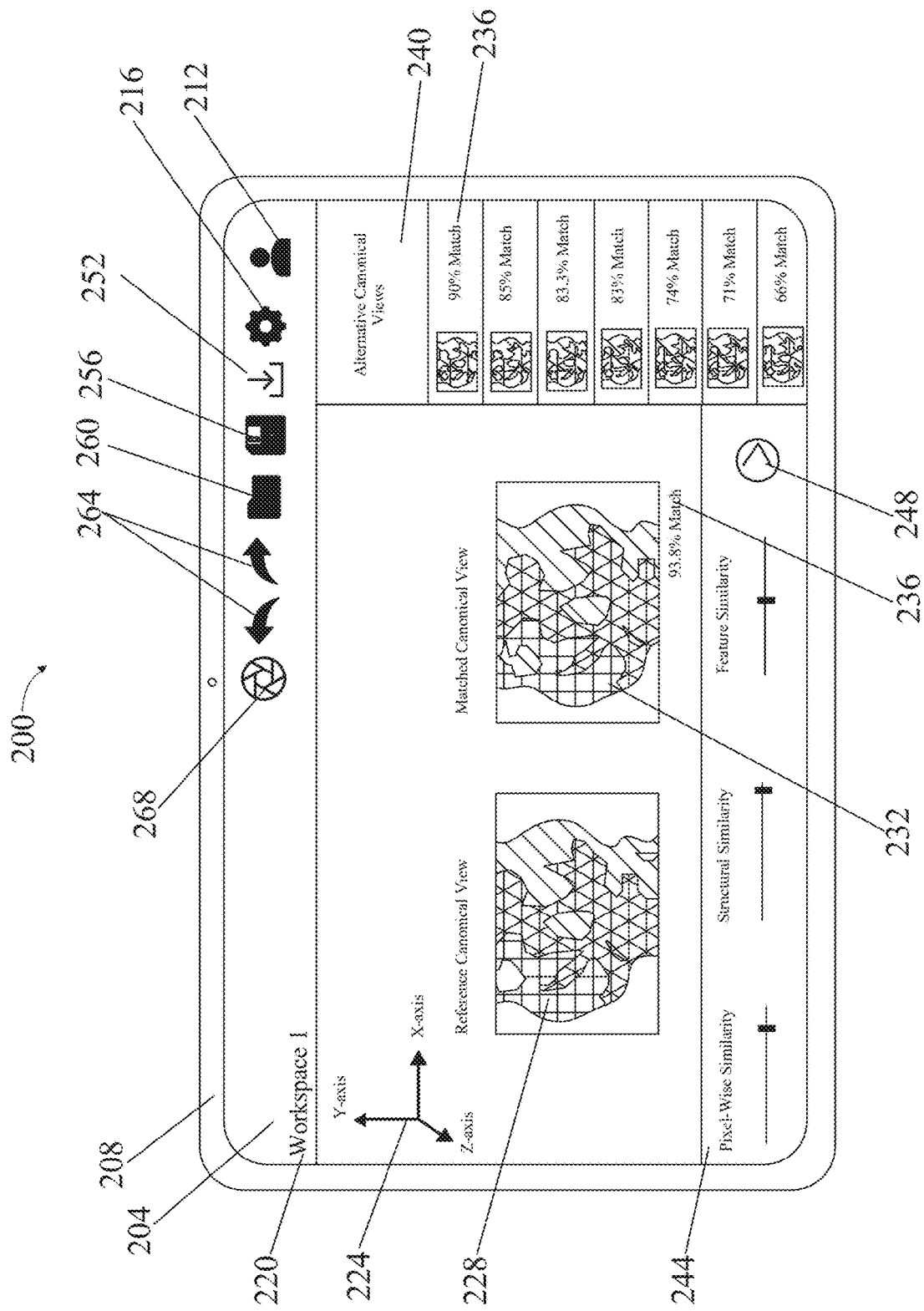
FIG. 2 is an exemplary illustration of a graphical user interface.

Referring now to FIG. 2, an exemplary illustration 200 of a graphical user interface. In an embodiment, the graphical user interface (GUI) 204 may be displayed on a downstream device 208. In an embodiment, the downstream device 208 may include a smartphone, tablet, or computer. In an embodiment, the GUI 204 may include a user profile icon 212. In an embodiment, the user profile icon 212 may serve as an interactive element that allows users to access and manage their personal account settings. In an embodiment, the user profile icon 212 may provide a direct link to the user's profile, where they may update personal information, review activity history, and configure preferences related to their interactions within the system. In an embodiment, the user profile icon 212 may enable users to modify details such as their name, contact information, medical history, or security settings. In an embodiment, the user profile icon 212 may serve as a gateway to account-related features, including login credentials, privacy controls, and system permissions. In an embodiment, the user profile icon 212 may support multi-user functionality, allowing different users to switch profiles or customize their experience within the same system. In an embodiment, the user profile icon 212 may incorporate a visual indicator, such as a profile picture placeholder, initials, or a silhouette, providing a recognizable representation of the user. In an embodiment, the user profile icon 212 may include a notification badge, alerting users to profile-related updates, messages, or required actions. In an embodiment, the user profile icon 212 may facilitate seamless user management and personalization within the GUI 204. In an embodiment, the GUI 204 may include a gear icon 216. The GUI 204 may incorporate a gear icon 216, which may provide access to system settings, allowing users to customize preferences, adjust configurations, or manage administrative controls. In an embodiment, the GUI 204 may include a header 220. In an embodiment, the header 220 may include the title of the application, a logo, a timestamp of the current session, user information (e.g., logged-in user's name), and/or a breadcrumb navigation bar showing the current workflow stage. In an embodiment, the GUI 204 may include a coordinate system 224. In an embodiment, the coordinate system 224 may include a grid overlay, labeled axes, such as X, Y, and Z for 3D visualization, and numerical indicators that help align and position images or models accurately. In an embodiment, the GUI 204 may include a reference canonical view 228. In an embodiment, the reference canonical 228 view may include a predefined, standard representation of a medical image used for comparison against the matched canonical view. In an embodiment, the reference canonical 228 may be displayed as a thumbnail, split-screen, or overlay. In an embodiment, the GUI 204 may include a matched canonical view 232. In an embodiment, the matched canonical view 232 may include an image that has been extracted or processed based on system criteria. It may be displayed with highlighting, annotations, or transformation controls. In an embodiment, the GUI 204 may include a confidence score 236. In an embodiment, the confidence score 236 may include a numerical percentage, such as 92%. In an embodiment, the confidence score 236 may include a color-coded bar, for example, without limitation, green for high confidence, yellow for medium, red for low, that visually represents the system's certainty in the matched canonical view. In an embodiment, the GUI 204 may include one or more alternative canonical view 240. In an embodiment, the one or more alternative canonical view 240 may include selectable thumbnails of different representations, a dropdown menu allowing the user to choose between multiple views, or an option to generate additional alternative views. In an embodiment, the GUI 204 may include a similarity metric panel 244. In an embodiment, the similarity metric panel 244 may include a chart or numerical indicators, such as cosine similarity score of 0.89, structural similarity index of 85%, that quantify the degree of resemblance between the matched canonical view 232 and the reference canonical view 228.

In an embodiment, the GUI 204 may include a next button 248. In an embodiment, the next button 248 may include a clickable arrow or labeled button such as "Next," that allows users to proceed to the next set of parameters of similarity metrics in the similarity metric panel 244. In an embodiment, the GUI 204 may include a download button 252. In an embodiment, the download button 252 may include a cloud or arrow-down icon that, when clicked, saves the matched canonical view or other relevant data in a specified file format, such as DICOM, PNG, or CSV. In an embodiment, the GUI 204 may include a save button 256. In an embodiment, the save button 256 may include a floppy disk icon or labeled button such as, "Save Progress," that stores the current state of the matched canonical view 232 and associated data in a database or local file. In an embodiment, the GUI 204 may include an open button 260. In an embodiment, the open button 260 may include a folder or file icon that allows users to browse and load previously saved canonical views or datasets. In an embodiment, the GUI 204 may include an undo/redo button 264. In an embodiment, the undo/redo button 264 may include curved arrows, one pointing left for undo, one pointing right for redo, that allow users to revert or reapply recent changes to the matched canonical view. In an embodiment, the GUI 204 may include a capture button 268. In an embodiment, the capture button 268 may include a camera icon or labeled button, such as "Capture Image," that enables users to take a sweep using the at least a transducer 106, which may then be saved, analyzed, or shared. Upon activation, the capture button 268 may trigger the transducer 106 to begin collecting ultrasound data 108 from a manual sweep, which may involve scanning or imaging a structure within a patient in real-time. The sweep may capture data in various formats, such as 2D grayscale images, 3D volumetric scans, or time-sequenced imaging frames, depending on the capabilities of the transducer 106 and the imaging modality being utilized. The captured data may be automatically stored in memory or a designated database, where it may be processed, analyzed, or compared against existing reference data. Additionally and or alternatively, the system may provide users with options to annotate, adjust, or enhance the captured image before saving or sharing it. In some embodiments, the capture button 268 may be accompanied by status indicators, such as a flashing recording symbol, a progress bar, or a confirmation message, to provide feedback to the user during the capture process. The capture button 268 may also support shortcut functionalities, such as long-press activation for continuous scanning or double-tap for capturing multiple frames. Without limitation, the capture button 268 may be integrated with workflow automation, allowing the apparatus to automatically label, tag, or pre-process the captured data based on predefined parameters. This ensures efficiency and consistency in data management, particularly in applications such as medical imaging, industrial inspections, or computer vision-based analysis.

Figure 3:
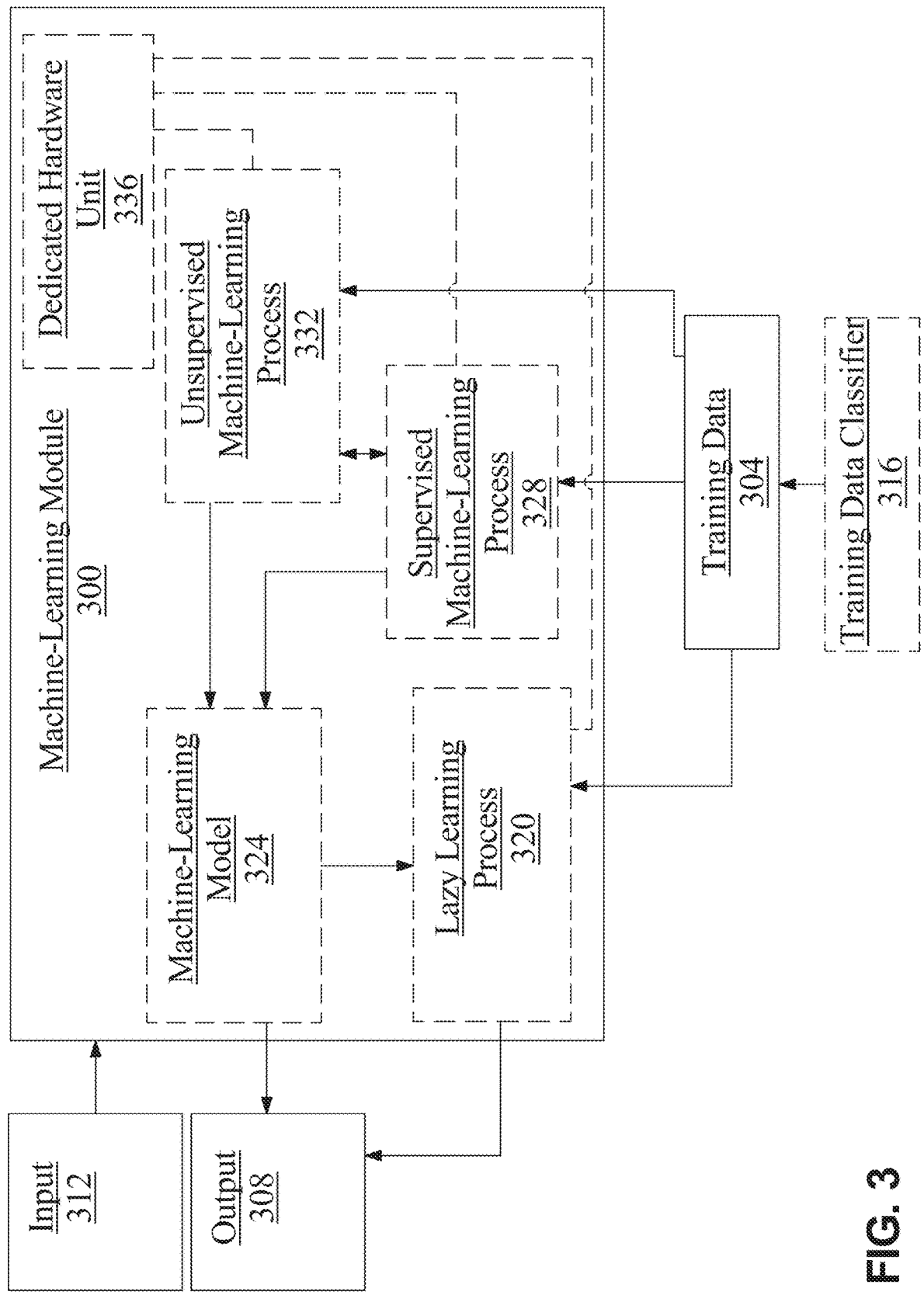
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs include ultrasound data and plurality of reference canonical views and outputs include plurality of canonical views wherein the plurality of canonical views comprises initial canonical views and matching canonical views.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to a cohort of ultrasound data and/or a plurality of reference canonical views, wherein the subset of training data may be selected based on initial canonical views and matching canonical views.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include ultrasound data and plurality of reference canonical views as described above as inputs, plurality of canonical views wherein the plurality of canonical views comprises initial canonical views and matching canonical views as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like. A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
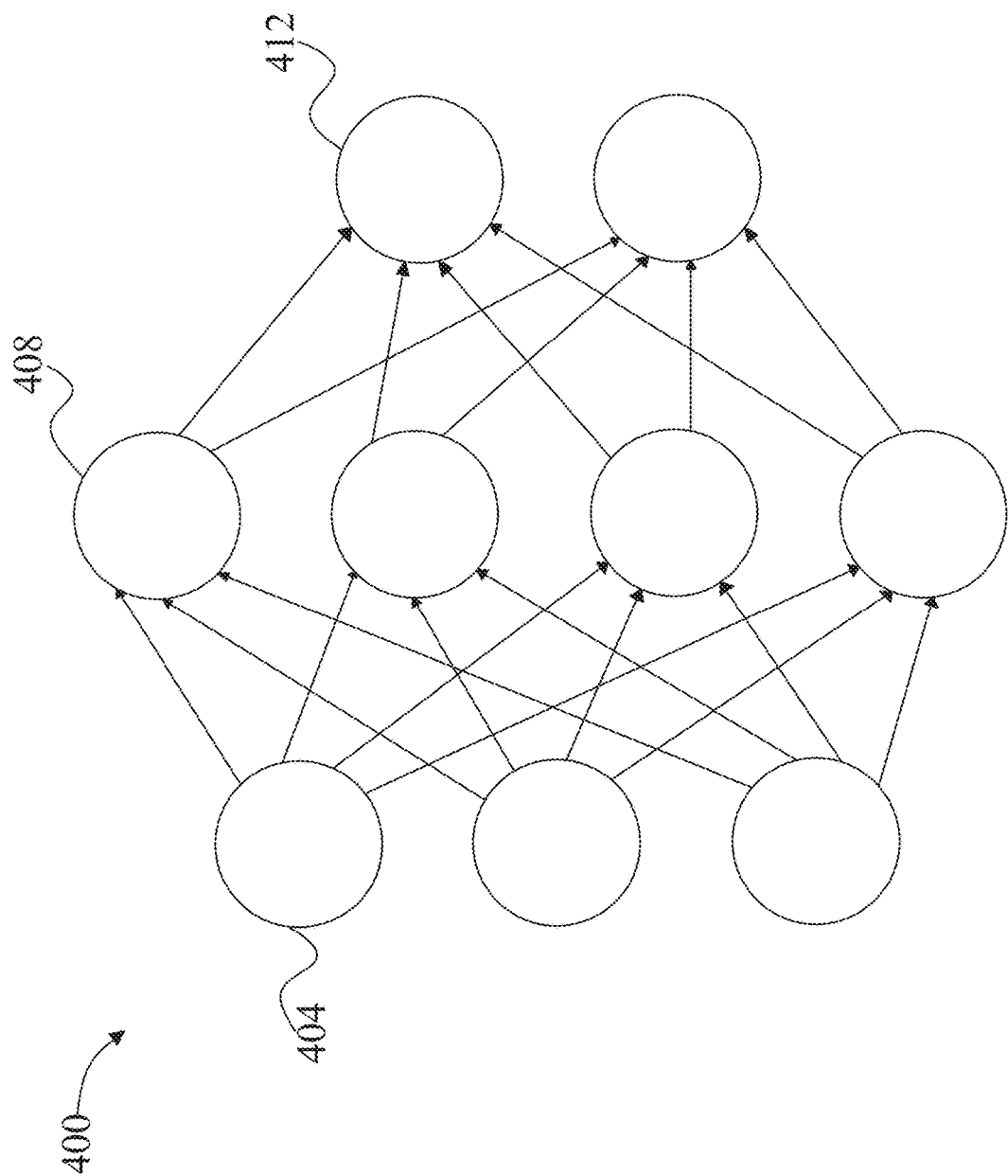
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
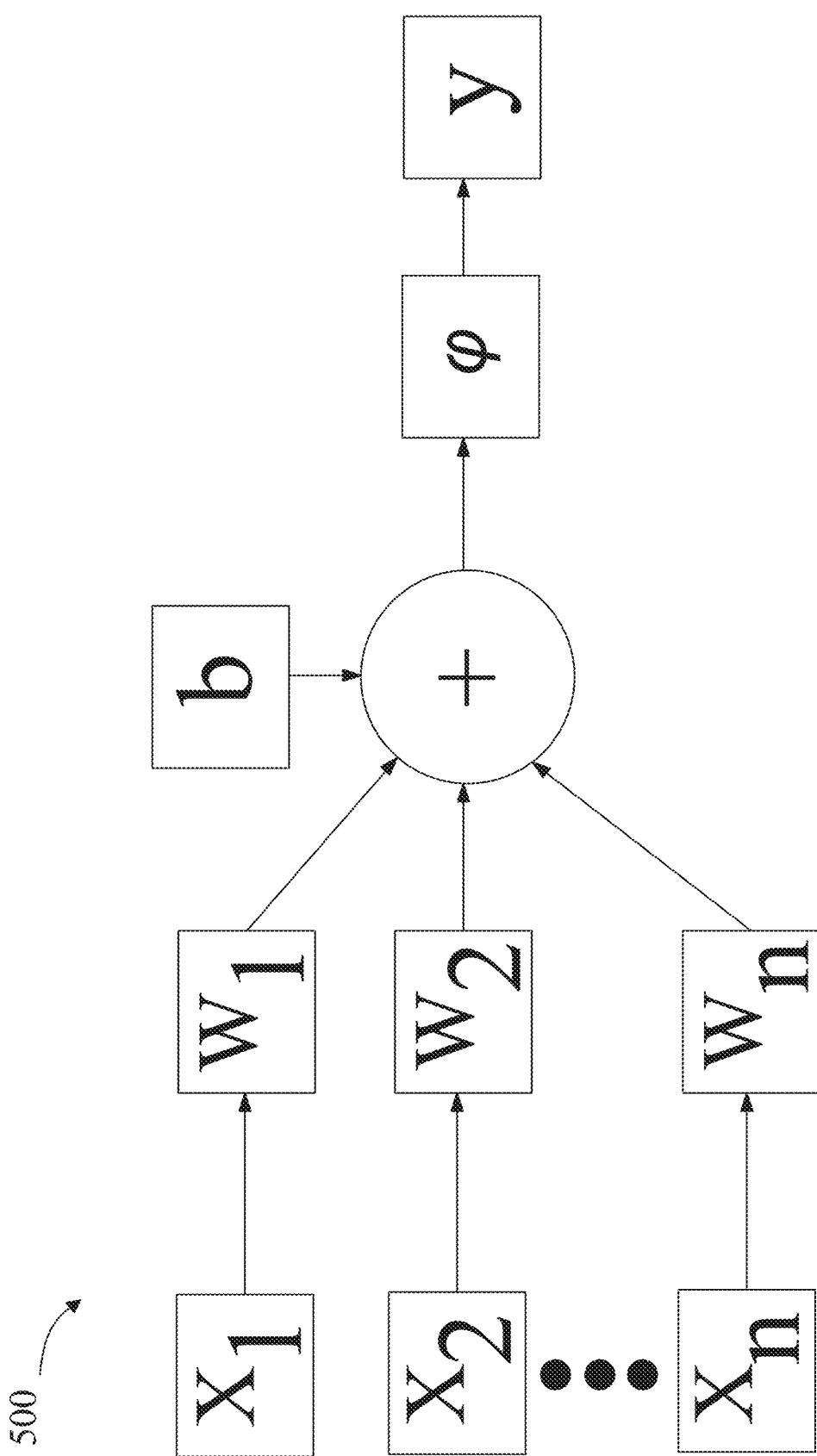
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
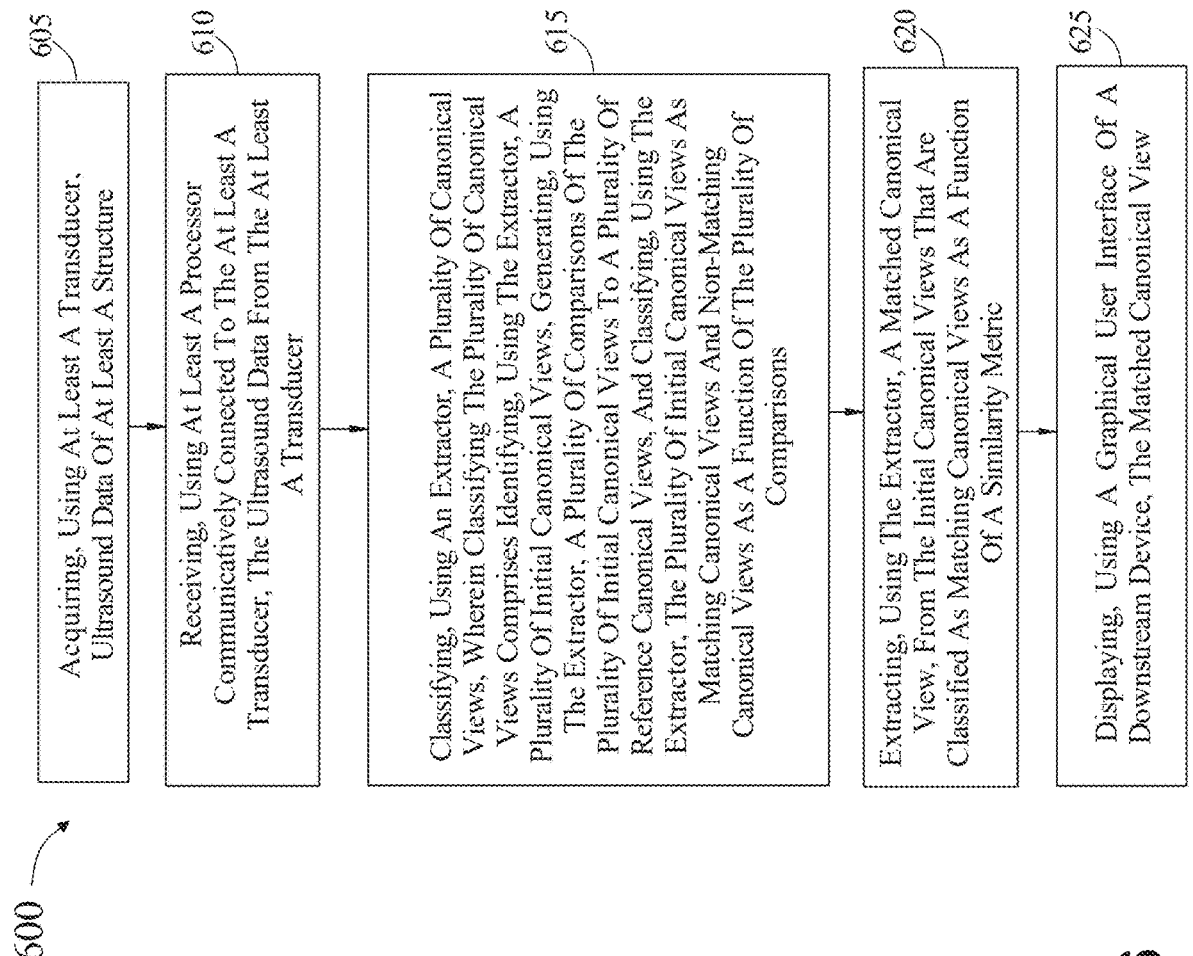
FIG. 6 is a block diagram of an exemplary method for automatically extracting canonical views from ultrasound imaging data.

Referring now to FIG. 6, a flow diagram of an exemplary method 600 for automatically extracting canonical views from ultrasound imaging data is illustrated. At step 605, method 600 includes acquiring, using at least a transducer, ultrasound data of at least a structure. In an embodiment, the apparatus may further include a catheter coupled to the at least a transducer, wherein the catheter is configured to be used for at least a percutaneous imaging procedure. This may be implemented as described and with reference to FIGS. 1-5.

Still referring to FIG. 6, at step 610, method 600 includes receiving, using at least a processor communicatively connected to the at least a transducer, the ultrasound data from the at least a transducer. This may be implemented as described and with reference to FIGS. 1-5.

Still referring to FIG. 6, at step 615, method 600 includes classifying, using an extractor, a plurality of canonical views, wherein classifying the plurality of canonical views comprises identifying, using the extractor, a plurality of initial canonical views, generating, using the extractor, a plurality of comparisons of the plurality of initial canonical views to a plurality of reference canonical views, and classifying, using the extractor, the plurality of initial canonical views as matching canonical views and non-matching canonical views as a function of the plurality of comparisons. This may be implemented as described and with reference to FIGS. 1-5.

Still referring to FIG. 6, at step 620, method 600 includes extracting, using the extractor, a matched canonical view, from the initial canonical views that are classified as matching canonical views as a function of a similarity metric. In an embodiment, wherein extracting, using the extractor, the matched canonical view may further include ranking, using the extractor, the plurality of initial canonical views from highest similarity to lowest similarity based on the similarity metric. In an embodiment, the at least a processor may be further configured to generate the similarity metric by computing, using one or more feature extraction techniques, a quantitative measure of alignment between the initial canonical views and the reference canonical views. In an embodiment, the extractor may include a machine learning model, wherein the machine learning model is trained using an extractor training dataset, wherein the extractor training dataset comprises historical ultrasound data associated with historical matched canonical views. This may be implemented as described and with reference to FIGS. 1-5.

Still referring to FIG. 6, at step 625, method 600 includes displaying, using a graphical user interface of a downstream device, the matched canonical view. In an embodiment, further may include receiving, using the at least a processor, a user input from the graphical user interface and conditionally updating, using the at least a processor, the matched canonical view as a function of the user input. In an embodiment, the user input may include a confirmation datum. In an embodiment, the at least a processor may be further configured to refine the matched canonical view as a function of the user input, wherein refining the matched canonical view comprises receiving, using the graphical user interface, a request of the user input and receiving, using the graphical user interface, an alternative canonical view of the plurality of initial canonical views. In an embodiment, generating, using the extractor, the plurality of comparisons of the plurality of initial canonical views may include extracting one or more features from the plurality of initial canonical views using a deep neural network. In an embodiment, the at least a computing device may be configured to save the matched canonical view as a DICOM image in a database. This may be implemented as described and with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM"

device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
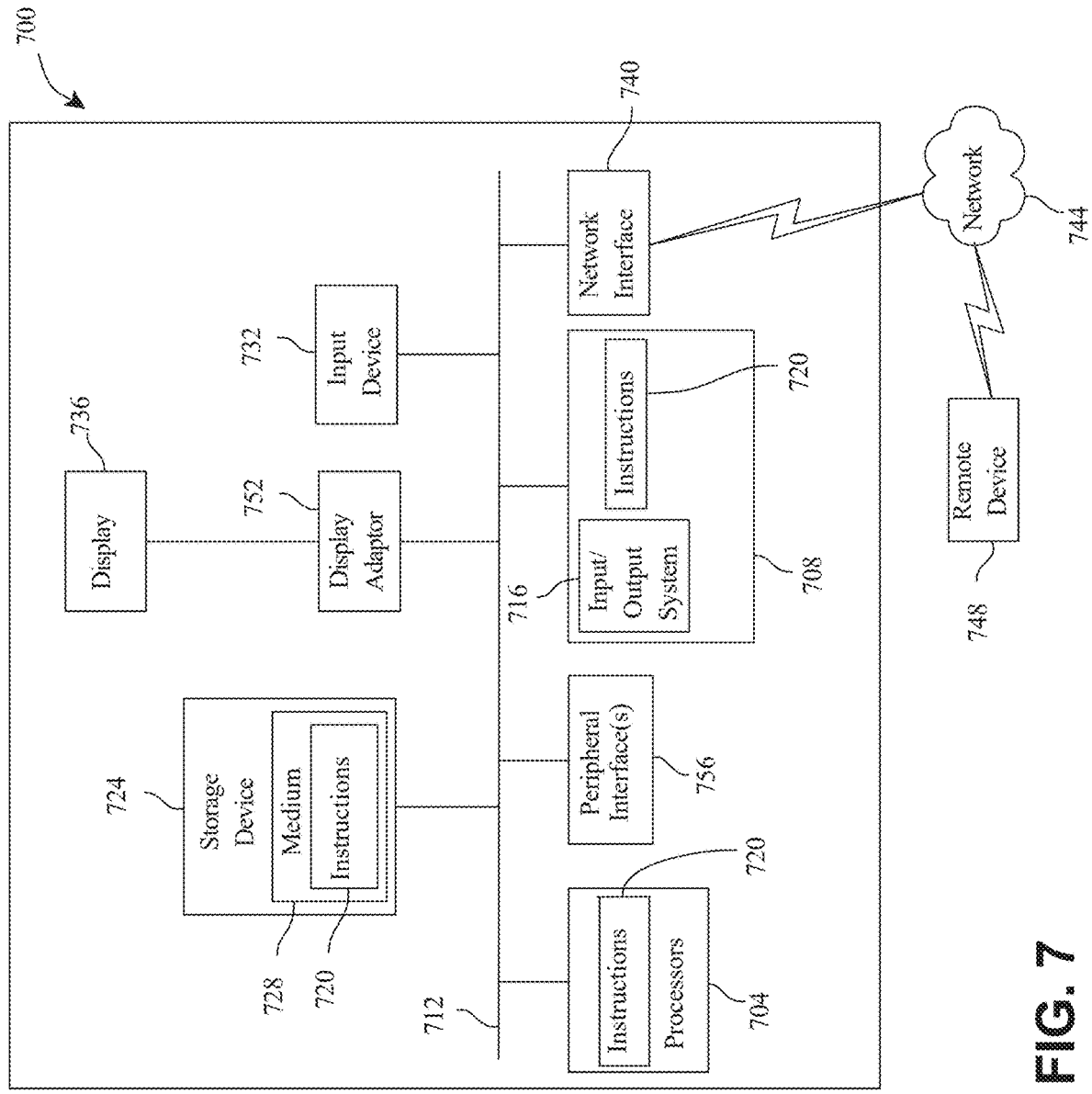
FIG. 7 is a block diagram of a computing system that can be used to implement any one or more of the methodologies disclosed herein and any one or more portions thereof.

FIG. 7 shows a diagrammatic representation of one embodiment of computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for automatically extracting canonical views from ultrasound imaging data, wherein the apparatus comprises:
   at least a transducer configured to acquire ultrasound data of at least a structure;
   at least a computing device, wherein the computing device is communicatively connected to the at least a transducer, the at least a computing device comprises:
      a memory; and
      at least a processor communicatively connected to the memory, wherein the memory contains instructions configuring the at least a processor to:
         receive the ultrasound data from the at least a transducer;
         classify, using an extractor, a plurality of canonical views, wherein classifying the plurality of canonical views comprises:
            identifying, using the extractor, a plurality of initial canonical views;
            generate, using the extractor, a plurality of comparisons of the plurality of initial canonical views to a plurality of reference canonical views; and
            classify, using the extractor, the plurality of initial canonical views as matching canonical views and non-matching canonical views as a function of the plurality of comparisons;
         extract, using the extractor, a matched canonical view, from the initial canonical views that are classified as matching canonical views as a function of a similarity metric; and
         display, using a graphical user interface of a downstream device, the matched canonical view.

2. The apparatus of claim 1, further comprising a catheter coupled to the at least a transducer, wherein the catheter is configured to be used for at least a percutaneous imaging procedure.

3. The apparatus of claim 1, further comprising:
   receiving, using the at least a processor, a user input from the graphical user interface; and
   conditionally updating, using the at least a processor, the matched canonical view as a function of the user input.

4. The apparatus of claim 3, wherein the user input comprises a confirmation datum.

5. The apparatus of claim 3, wherein the at least a processor is further configured to refine the matched canonical view as a function of the user input, wherein refining the matched canonical view comprises:
   receiving, using the graphical user interface, a request of the user input; and
   receiving, using the graphical user interface, an alternative canonical view of the plurality of initial canonical views.

6. The apparatus of claim 1, wherein extracting, using the extractor, the matched canonical view further comprises ranking, using the extractor, the plurality of initial canonical views from highest similarity to lowest similarity based on the similarity metric.

7. The apparatus of claim 1, wherein the at least a processor is further configured to generate the similarity metric by computing, using one or more feature extraction techniques, a quantitative measure of alignment between the initial canonical views and the reference canonical views.

8. The apparatus of claim 1, wherein generating, using the extractor, the plurality of comparisons of the plurality of initial canonical views comprises extracting one or more features from the plurality of initial canonical views using a deep neural network.

9. The apparatus of claim 1, wherein the extractor comprises a machine learning model, wherein the machine learning model is trained using an extractor training dataset, wherein the extractor training dataset comprises historical ultrasound data associated with historical matched canonical views.

10. The apparatus of claim 1, wherein the at least a computing device is configured to save the matched canonical view as a DICOM image in a database.

11. A method for automatically extracting canonical views from ultrasound imaging data, wherein the method comprises:
   acquiring, using at least a transducer, ultrasound data of at least a structure;

receiving, using at least a processor communicatively connected to the at least a transducer, the ultrasound data from the at least a transducer;

classifying, using an extractor, a plurality of canonical views, wherein classifying the plurality of canonical views comprises:

identifying, using the extractor, a plurality of initial canonical views;

generate, using the extractor, a plurality of comparisons of the plurality of initial canonical views to a plurality of reference canonical views; and classify, using the extractor, the plurality of initial canonical views as matching canonical views and non-matching canonical views as a function of the plurality of comparisons;

extracting, using the extractor, a matched canonical view, from the initial canonical views that are classified as matching canonical views as a function of a similarity metric; and displaying, using a graphical user interface of a downstream device, the matched canonical view.

12. The method of claim 11, further comprising coupling a catheter to the at least a transducer, wherein the catheter is used for at least a percutaneous imaging procedure.

13. The method of claim 11, further comprising:
receiving, using the at least a processor, a user input from the graphical user interface; and
conditionally updating, using the at least a processor, the matched canonical view as a function of the user input.

14. The method of claim 13, further comprising receiving a confirmation datum of the user input.

15. The method of claim 13, further comprising refining the matched canonical view as a function of the user input, wherein refining the matched canonical view comprises:
receiving, using the graphical user interface, a request of the user input; and
receiving, using the graphical user interface, an alternative canonical view of the plurality of initial canonical views.

16. The method of claim 11, wherein extracting, using the extractor, the matched canonical view further comprises ranking, using the extractor, the plurality of initial canonical views from highest similarity to lowest similarity based on the similarity metric.

17. The method of claim 11, further comprising generating, using the at least a processor, the similarity metric by computing, using one or more feature extraction techniques, a quantitative measure of alignment between the initial canonical views and the reference canonical views.

18. The method of claim 11, wherein generating, using the extractor, the plurality of comparisons of the plurality of initial canonical views comprises extracting one or more features from the plurality of initial canonical views using a deep neural network.

19. The method of claim 11, wherein the extractor comprises a machine learning model, wherein the machine learning model is trained using an extractor training dataset, wherein the extractor training dataset comprises historical ultrasound data associated with historical matched canonical views.

20. The method of claim 11, further comprising saving, using the at least a processor, the matched canonical view as a DICOM image in a database.

* * * * *